(12) United States Patent
Hashimoto et al.

(10) Patent No.: US 10,977,834 B2
(45) Date of Patent: Apr. 13, 2021

(54) SEMICONDUCTOR DEVICE AND METHOD FOR IMAGE PROCESSING AND IMAGE COMPRESSION USING THE SEMICONDUCTOR DEVICE

(71) Applicant: RENESAS ELECTRONICS CORPORATION, Tokyo (JP)

(72) Inventors: Ryoji Hashimoto, Tokyo (JP); Keisuke Matsumoto, Tokyo (JP); Nhat Van Huynh, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 46 days.

(21) Appl. No.: 16/409,502

(22) Filed: May 10, 2019

(65) Prior Publication Data
US 2019/0378306 A1    Dec. 12, 2019

(30) Foreign Application Priority Data

Jun. 6, 2018    (JP) .............................. JP2018-108454

(51) Int. Cl.
| | | |
|---|---|---|
| *G06T 9/00* | (2006.01) | |
| *G06T 1/60* | (2006.01) | |
| *H04N 19/423* | (2014.01) | |
| *H04N 19/80* | (2014.01) | |
| *H04N 19/85* | (2014.01) | |

(Continued)

(52) U.S. Cl.
CPC ............... *G06T 9/00* (2013.01); *G06T 1/60* (2013.01); *H04N 19/176* (2014.11); *H04N 19/42* (2014.11); *H04N 19/423* (2014.11); *H04N 19/80* (2014.11); *H04N 19/85* (2014.11); *H04N 19/86* (2014.11); *H04N 19/625* (2014.11)

(58) Field of Classification Search
CPC ........................................................ G06T 1/60
See application file for complete search history.

(56) References Cited

U.S. PATENT DOCUMENTS

| | | | | |
|---|---|---|---|---|
| 2011/0206289 | A1* | 8/2011 | Dikbas ................ | H04N 19/147 382/238 |
| 2013/0208808 | A1 | 8/2013 | Sasai et al. | |

(Continued)

FOREIGN PATENT DOCUMENTS

| | | | | |
|---|---|---|---|---|
| CN | 105578190 A | * | 5/2016 | ............. H04N 19/11 |
| JP | 2017-117145 A | | 6/2017 | |

OTHER PUBLICATIONS

Extended European Search Report issued in corresponding European Patent Application No. 19176102.2-1224, dated Nov. 14, 2019.

*Primary Examiner* — Casey L Kretzer
(74) *Attorney, Agent, or Firm* — McDermott Will & Emery LLP

(57) ABSTRACT

The present invention provides a semiconductor device enabling efficient compression without increasing the circuit size and a processing method using the semiconductor device. According to an embodiment, an image processor includes: a coding circuit to perform image processing on a target image divided into a plurality of tiles, the image processing being performed on each of the tiles; a determination circuit to determine whether a tile boundary is included in the area of an image block serving as a unit of compression of the target image; and a compression circuit to compress the image block image-processed by the coding circuit, according to a determination result of the determination circuit.

15 Claims, 7 Drawing Sheets

(51) Int. Cl.
    *H04N 19/42*     (2014.01)
    *H04N 19/176*     (2014.01)
    *H04N 19/86*     (2014.01)
    *H04N 19/625*     (2014.01)

(56) References Cited

U.S. PATENT DOCUMENTS

| | | | |
|---|---|---|---|
| 2014/0205017 A1* | 7/2014 | Guo | H04N 19/433 375/240.25 |
| 2016/0092112 A1* | 3/2016 | Akgun | G06F 3/06 711/154 |
| 2017/0185521 A1 | 6/2017 | Matsubara et al. | |
| 2019/0037226 A1* | 1/2019 | Yang | H04N 19/426 |

\* cited by examiner

SEMICONDUCTOR DEVICE AND METHOD FOR IMAGE PROCESSING AND IMAGE COMPRESSION USING THE SEMICONDUCTOR DEVICE

CROSS-REFERENCE TO RELATED APPLICATIONS

The disclosure of Japanese Patent Application No. 2018-108454 filed on Jun. 6, 2018 including the specification, drawings and abstract is incorporated herein by reference in its entirety.

BACKGROUND

The present invention relates to a semiconductor device and a processing method using the semiconductor device and relates to, for example, a semiconductor device suitable for efficiently compressing image data without increasing a circuit size, and a processing method using the semiconductor device.

For example, an image processor generates a coding stream by coding each image (frame) including a moving image. In this case, the image processor writes a local decoding image, which corresponds to each image of the coding stream, into external memory via a writing bus, reads another local decoding image written in the external memory via a reading bus, and uses the image to predict an image to be coded.

In this image processor, however, a large-volume image may considerably consume the band of the bus between the image processor and the external memory, precluding efficient image processing.

Japanese Unexamined Patent Application Publication No. 2017-117145 discloses a solution to the problem. Japanese Unexamined Patent Application Publication No. 2017-117145 discloses the configuration of a semiconductor device that compresses coded data and then writes the data into memory. With this configuration, the semiconductor device can suppress the consumption of the band of a bus between the semiconductor device and memory, achieving efficient image processing.

SUMMARY

A recent image processor divides an image to be coded into multiple tiles and performs image processing (e.g., coding) on each of the tiles. If the compression technique of Japanese Unexamined Patent Application Publication No. 2017-117145 is applied to the image processor, an image block provided as a compression unit for, for example, two tiles cannot be compressed by the image processor until the completion of image processing on the two tiles when boundary of the two tiles exists in the compression unit. Thus, it is necessary to provide the image processor with a holding circuit for holding the image processing result of one of the tiles from the completion of image processing on the tile to the completion of image processing on the other tile. Other problems and new features will be clarified by the description and the accompanying drawings of the present specification.

According to an embodiment, a semiconductor device includes: a coding circuit to perform image processing on a target image divided into a plurality of tiles, the image processing being performed on each of the tiles; a determination circuit to determine whether a tile boundary is included in the area of an image block serving as a unit of compression of the target image; and a compression circuit to compress the image block image-processed by the image processing circuit, according to the determination result of the determination circuit.

According to another embodiment, a processing method using a semiconductor device includes the steps of: performing image processing on a target image divided into a plurality of tiles, the image processing being performed on each of the tiles; determining whether a tile boundary is included in the area of an image block serving as a unit of compression of the target image; and compressing the image-processed image block according to a determination result.

The embodiment can provide a semiconductor memory device enabling efficient compression without increasing the circuit size, and a processing method using the semiconductor device.

DETAILED DESCRIPTION

Figure 1:
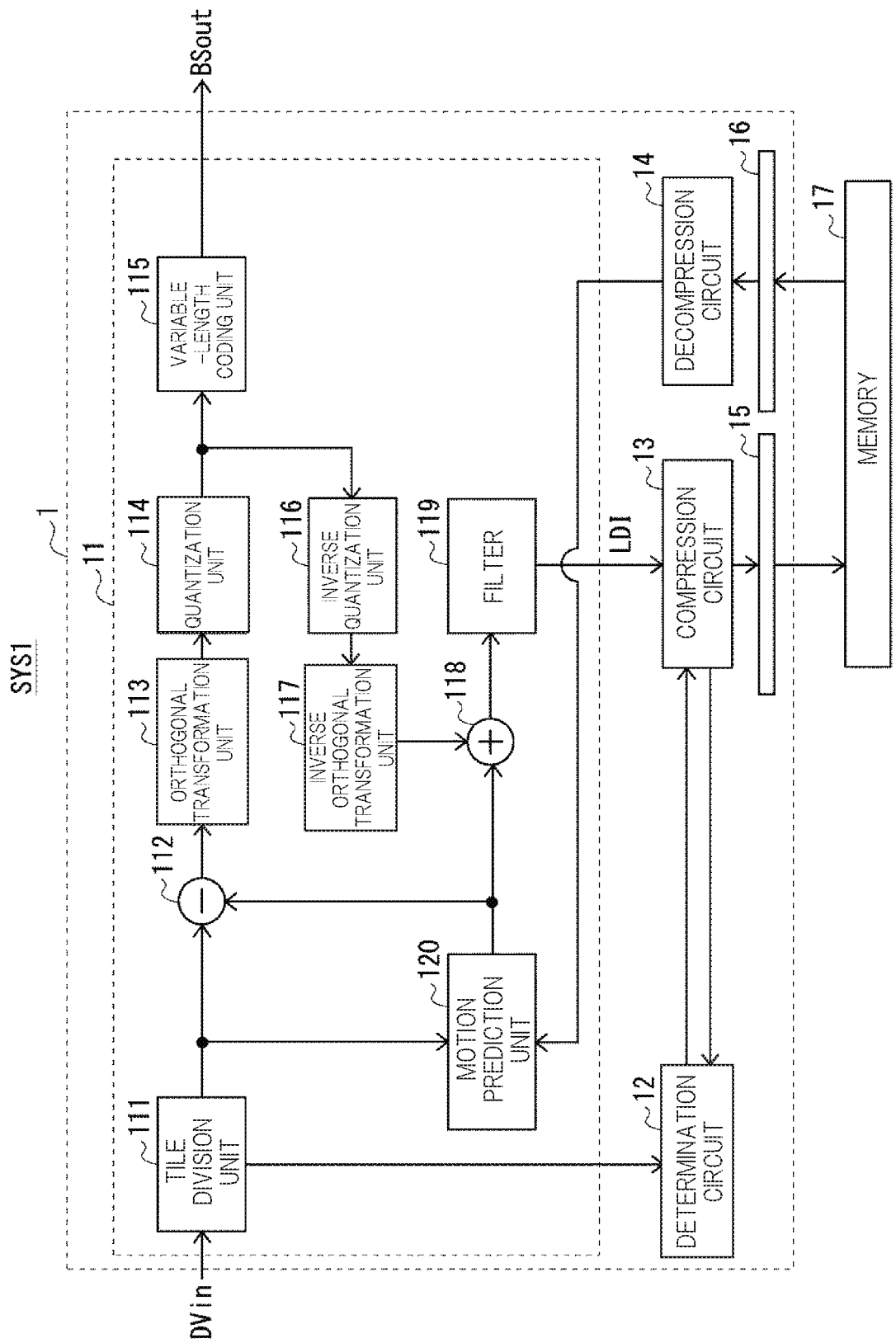
FIG. 1 illustrates a configuration example of an image processing system according to a first embodiment.

For clarification of the explanation, the following description and drawings are optionally omitted and simplified. Moreover, elements illustrated as functional blocks for various kinds of processing in the drawings can be configured with hardware including a central processing unit (CPU), memory, and other circuits and software including programs loaded in the memory. Thus, a person skilled in the art could understand that these functional blocks can be implemented in various forms, for example, by hardware alone, software alone, or a combination of hardware and software. The forms of the functional blocks are not particularly limited. The same elements are indicated by the same reference numerals in the drawings and the redundant explanation is optionally omitted.

The programs can be provided for computers while being stored using various kinds of non-transitory computer-readable media. The non-transitory computer readable media include various kinds of substantial recording media. Examples of non-transitory computer readable media include a magnetic recording medium (e.g., a flexible disk, a magnetic tape, and a hard disk drive), a magneto-optical recording medium (e.g., a magneto-optical disk), a CD-ROM (Read Only Memory), a CD-R, a CD-R/W, and semiconductor memory (e.g., a mask ROM, a PROM (Programmable ROM), an EPROM (Erasable PROM), a flash ROM, or RAM (Random Access Memory)). The programs may be provided for computers by using various kinds of transitory computer-readable media. Examples of the transitory computer readable media include an electric signal, an optical signal, and an electromagnetic wave. The transitory computer-readable media can supply programs for computers through wire communication lines including an electric wire and an optical fiber, or radio communication lines.

First Embodiment

FIG. 1 is a block diagram illustrating a configuration example of an image processing system (semiconductor system) SYS1 according to a first embodiment. The image processing system SYS1 according to the present embodiment is a system for coding and compression on images (frames) including a moving image. The system will be specifically described below.

As shown in FIG. 1, the image processing system SYS1 includes a coding circuit (image processing circuit) 11, a determination circuit 12, a compression circuit 13, a decompression circuit 14, a bus for write 15, a bus for read 16, and a memory 17. The constituent elements of the image processing system SYS1 other than the memory 17 include the image processor (semiconductor device) 1.

The coding circuit 11 is a section for generating a coding stream BSout by coding an image to be coded (hereinafter will be referred to as a target image) DVin. Specifically, the coding circuit 11 includes a tile division unit 111, a subtracter 112, an orthogonal transformation unit 113, a quantization unit 114, a variable-length coding unit 115, an inverse quantization unit 116, an inverse orthogonal transformation unit 117, an adder 118, a filter 119, and a motion prediction unit 120.

The tile division unit 111 divides the target image DVin into multiple rectangular tiles serving as units of coding. The coding of the tiles by the coding circuit 11 is actually performed in a segmented manner for processing blocks including each tile. For example, in HEVC (High Efficiency Video Coding), coding is performed in CTBs (Coding Tree Blocks) including each tile. Moreover, in VP9, coding is performed in Superblocks including each tile. As a matter of course, coding is not always performed in CTBs or Superblocks and can be performed in other processing blocks including each tile.

The subtracter 112 subtracts, from each of the tiles sequentially outputted from the tile division unit 111 (hereinafter will be referred to as coding target tiles), a corresponding prediction tile outputted from the motion prediction unit 120, so that a differential tile is outputted. The differential tile is obtained by removing spatial redundancy and temporal redundancy from the coding target tile.

The orthogonal transformation unit 113 outputs a DCT coefficient by performing DCT (Discrete Cosine Transform) on each differential tile. The quantization unit 114 quantizes the DCT coefficient outputted from the orthogonal transformation unit 113. The present embodiment describes an example in which the orthogonal transformation unit 113 performs DCT on each differential tile. The transform is not limited to DCT. The orthogonal transformation unit 113 may be configured to perform other kinds of orthogonal transformation such as DST (Discrete Sign Transform) on each differential tile.

The variable-length coding unit 115 performs variable-length coding on the DCT coefficient quantized by the quantization unit 114.

The inverse quantization unit 116 performs inverse quantization on the quantized DCT coefficient. The inverse orthogonal transformation unit 117 outputs a differential decoding tile by performing inverse DCT on the DCT coefficient inversely quantized by the inverse quantization unit 116. The differential decoding tile is information corresponding to the differential tile outputted from the subtracter 112.

The adder 118 adds the prediction tile and the differential decoding tile. The filter 119 outputs a local decoding tile by filtering the output result of the adder 118. For example, the filter 119 performs filtering for smoothing irregularities at tile boundaries.

In this configuration, the coding circuit 11 performs the same processing on each of the coding target tiles including the target image DVin, so that the coding stream BSout generated by coding the target image DVin is outputted and a local decoding image LDI including multiple local decoding tiles is outputted.

The determination circuit 12 determines whether a tile boundary X1 is included in the image blocks serving as the units of compression of the local decoding image LDI (more specifically, the target image DVin as an original image of the local decoding image LDI), based on division information acquired by the tile division unit 111 and compression information acquired by the compression circuit 13. The division information acquired by the tile division unit 111 includes information on, for example, the positions and sizes of the tiles. The compression information acquired by the compression circuit 13 includes information on, for example, the positions and sizes of the image blocks. The positions and sizes of the image blocks can be also acquired from the storage address of the memory 17.

The compression circuit 13 compresses the image blocks serving as the units of compression of the local decoding image LDI, according to the determination result of the determination circuit 12. For example, if the determination circuit 12 determines that the tile boundary X1 is not included in the image block to be compressed, the compression circuit 13 compresses the image block. In contrast, if the determination circuit 12 determines that the tile boundary X1 is included in the image block to be compressed, the compression circuit 13 does not compress the image block.

The image block compressed (or not compressed) by the compression circuit 13 is written into the memory 17 via the bus 15. The image block written into the memory 17 is used for inter-image prediction (inter-frame prediction) by the motion prediction unit 120 provided in the coding circuit 11.

The decompression circuit 14 expands the image block compressed by the compression circuit 13 from among the image blocks read from the memory 17 via the bus 16. The decompression circuit 14 then combines the image blocks so as to reproduce the local decoding image LDI.

In the coding circuit 11, the motion prediction unit 120 generates the prediction image between the tiles by comparing the coding target tile and the tile (reference tile) of an area corresponding to the coding target tile in the local decoding image LDI, and then the motion prediction unit 120 outputs, as the prediction tile, the tile compensating for generating the predicted image. As described above, the prediction tile is supplied to the subtracter 112 and the adder 118.

Thus, the image processor 1 and the image processing system SYS1 including the same according to the present embodiment do not compress the image block including the tile boundary X1. This can eliminate the need for providing a holding circuit for holding the coding result of one of two tiles, which are formed on both sides of the tile boundary X1, until the completion of image processing on one of the tiles after the completion of image processing on the other tile. Furthermore, the image processor 1 and the image processing system SYS1 including the same according to the present embodiment do not compress the image block not including the tile boundary X1. This can suppress the consumption of a band at the bus 15 between the image processor 1 and the memory 17, achieving efficient image processing. In other words, the image processor 1 and the image processing system SYS1 including the same according to the present embodiment can efficiently perform image processing without increasing the circuit size.

(Specific Example of the Contents of Processing Performed by the Image Processor 1)

Figure 2:
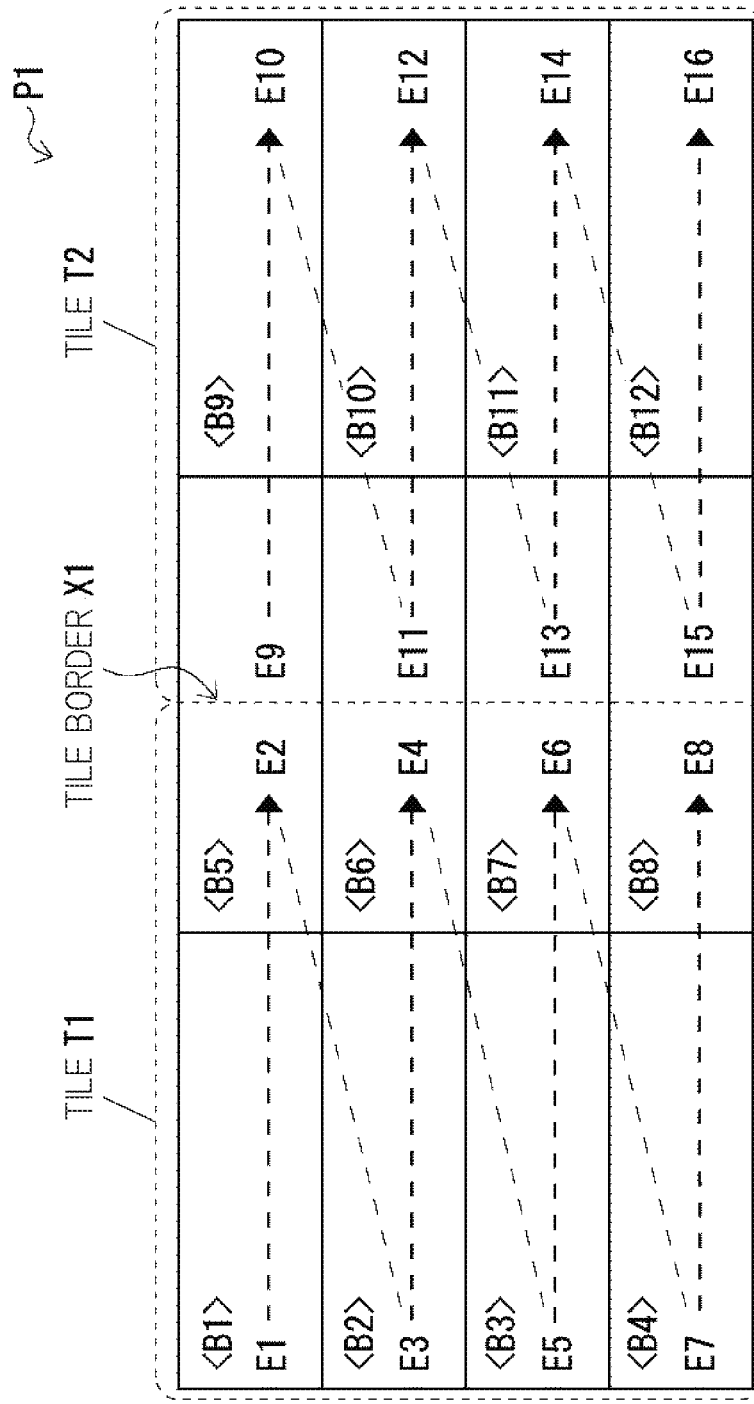
FIG. 2 is a schematic diagram of a partial area P1 of a target image DVin.

Referring to FIG. 2, determination and compression by the image processor 1 will be described in detail.

FIG. 2 is a schematic diagram of a partial area P1 of the image DVin. In the example of FIG. 2, the partial area P1 of the target image DVin is divided into rectangular tiles T1 and T2 serving as units of coding. Moreover, in the example of FIG. 2, the partial area P1 of the target image DVin is divided into rectangular image blocks B1 to B12 serving as units of compression.

For example, in the area P1 of the image DVin, the area of the tile T1 is first coded and then the area of the tile T2 is coded. Specifically, first in the area of the tile T1 divided into four rows, coding is sequentially performed on an area E1 to an area E2 in the first row, an area E3 to an area E4 in the second row, an area E5 to an area E6 in the third row, and an area E7 to an area E8 in the fourth row. Thereafter, in the area of the tile T2 divided into four rows, coding is sequentially performed on an area E9 to an area E10 in the first row, an area E11 to an area E12 in the second row, an area E13 to an area E14 in the third row, and an area E15 to an area E16 in the fourth row.

Compression is performed in parallel with the coding. The determination circuit 12 first determines whether the area of the image block B1 includes the boundary (hereinafter will be referred to as a tile boundary) X1 between the tiles T1 and T2. In this example, the determination circuit 12 determines that the area of the image block B1 does not include the tile boundary X1. Thus, the compression circuit 13 compresses the coded image block B1. The compressed image block B1 is written into the memory 17 via the bus 15. The same processing is performed on the image blocks B2 to B4.

The determination circuit 12 then determines whether the area of the image block B5 includes the tile boundary X1. In this example, the determination circuit 12 determines that the area of the image block B5 includes the tile boundary X1. Thus, in the area of the image block B5, the compression circuit 13 does not compress the image data of the area E2 (hereinafter will be referred to as image data E2) near the tile T1 coded in advance. The uncompressed image data E2 is written with dummy image data (hereinafter will be referred to as dummy data) D9 into the memory 17 via the bus 15. The dummy data D9 substitutes for the image data of the area E9 near the tile T2 that has not been coded yet. Thus, only the image data E2 may be written into the memory 17 without the dummy data D9. The same processing is performed on the image blocks B6 to B8.

Thereafter, when the area E9 of the tile T2 is coded, the image data of the area E9 (hereinafter will be referred to as image data E9) near the coded tile T2 is written into the memory 17 via the bus 15 without being compressed. At this point, if the dummy data D9 is written into the memory 17, the dummy data D9 is overwritten with the image data E9. In this case, the image E2 and the dummy data D9 are stored in the memory 17 without being compressed, so that the address of the stored dummy data D9 is easily calculated. The image data E9 may be written into the memory 17 from the coding circuit 11 through the compression circuit 13 or may be directly written into the memory 17 from the coding circuit 11. The same processing is performed on the image blocks B6 to B8 after the completion of coding of the areas E11, E13, and E15.

Subsequently, the determination circuit 12 determines that the area of the image block B9 does not include the tile boundary X1 between the tiles T1 and T2. Thus, the compression circuit 13 compresses the coded image block B9. The compressed image block B9 is written into the memory 17 via the bus 15. The same processing is performed on the image blocks B10 to B12.

As described above, the image processor 1 and the image processing system SYS1 including the same according to the present embodiment do not compress the image block (e.g., the image block B5) including the tile boundary X1. This can eliminate the need for providing a holding circuit for holding the coding result of the tile T1 from among the tiles T1 and T2, which are formed on both sides of the tile boundary X1, until the completion of image processing on the tile T2 after the completion of image processing on the tile T1. Furthermore, the image processor 1 and the image processing system SYS1 including the same according to the present embodiment do not compress the image block (e.g., the image block B1) not including the tile boundary X1. This can suppress the consumption of a band at the bus 15 between the image processor 1 and the memory 17, achieving efficient image processing. In short, the image processor 1 and the image processing system SYS1 including the same according to the present embodiment can efficiently perform image processing without increasing the circuit size.

In order to compress all the image blocks without a holding circuit in the image processor of Japanese Unexamined Patent Application Publication No. 2017-117145, a forced adjustment of the tile boundary X1 onto the boundary between the image blocks may cause problems such as irregularities in tile size. Even if the tile boundary X1 is adjusted onto the boundary between the image blocks, the image of the tile boundary X1 is typically filtered. Thus, it is necessary to provide a holding circuit for holding the image processing result of one of the two tiles, which are formed on both sides of the tile boundary X1, until the completion of image processing on one of the tiles and filtering on the image of the tile boundary X1 after the completion of image processing on the other tile. Unfortunately, this may increase the circuit size.

Second Embodiment

Figure 3:
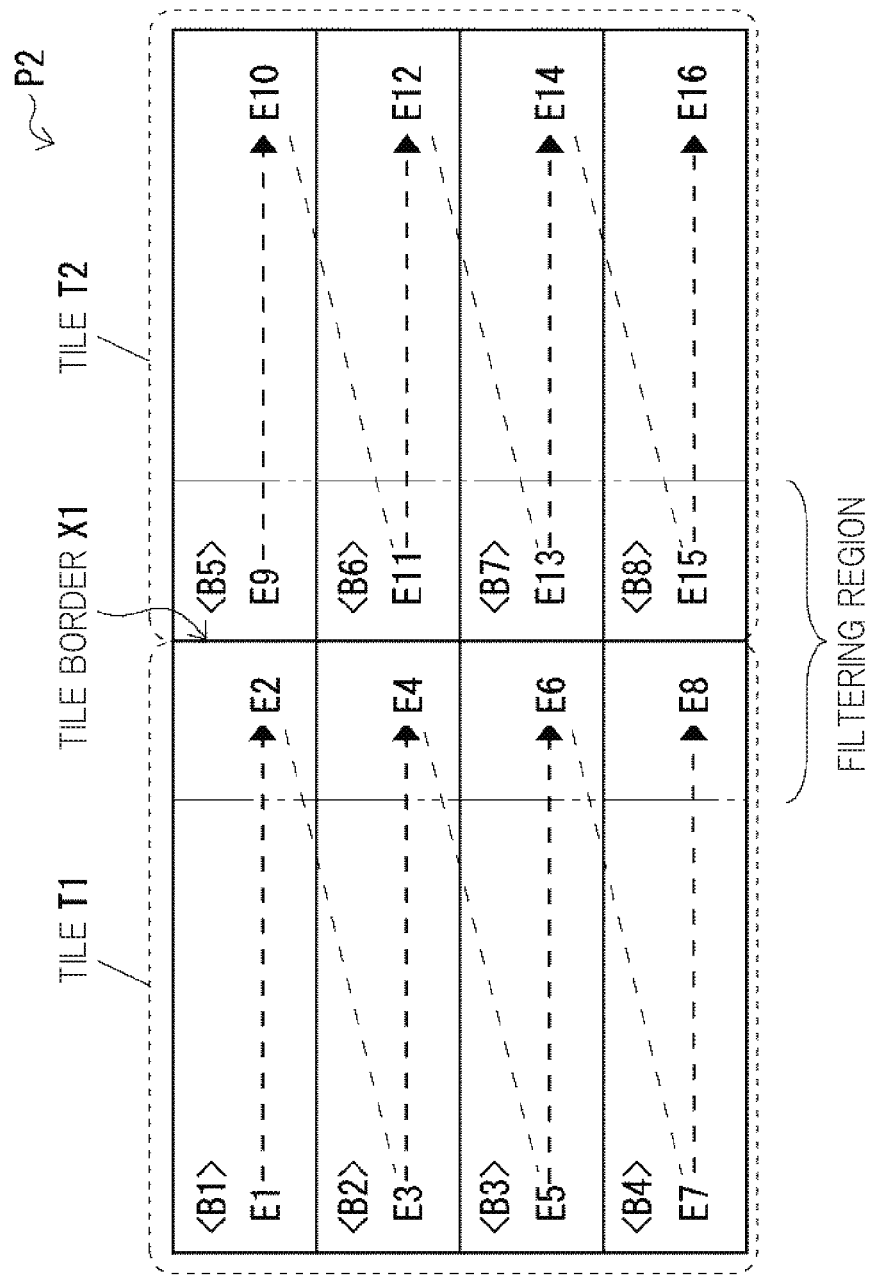
FIG. 3 is a schematic diagram of a partial area P2 of the target image DVin.

Referring to FIG. 3, the present embodiment will describe another example of determination and compression by an image processor 1.

FIG. 3 is a schematic diagram of a partial area P2 of an image DVin to be coded. In the example of FIG. 3, the partial area P2 of the target image DVin is divided into rectangular tiles T1 and T2 serving as units of coding. Moreover, in the example of FIG. 3, the partial area P2 of the target image DVin is divided into rectangular image blocks B1 to B8 serving as units of compression.

In the example of FIG. 3, a tile boundary X1 is located on the boundary between the adjacent image blocks B1 and B5. Likewise, the tile boundary X1 is located on the boundary between the adjacent image blocks B2 and B6, on the boundary between the adjacent image blocks B3 and B7, and on the boundary between the adjacent image blocks B4 and B8.

For example, in the partial area P2 of the image DVin, the area of the tile T1 is first coded and then the area of the tile T2 is coded. Specifically, first in the area of the tile T1 divided into four rows, coding is sequentially performed on an area E1 to an area E2 in the first row, an area E3 to an area E4 in the second row, an area E5 to an area E6 in the third row, and an area E7 to an area E8 in the fourth row. Thereafter, in the area of the tile T2 divided into four rows, coding is sequentially performed on an area E9 to an area E10 in the first row, an area E11 to an area E12 in the second row, an area E13 to an area E14 in the third row, and an area E15 to an area E16 in the fourth row.

A determination circuit 12 first determines that the tile boundary X1 is located on the boundary between the adjacent image blocks B1 and B5. Thus, a compression circuit 13 does not compress the coded image block B1. The uncompressed image block B1 is written into a memory 17 via a bus 15. The same processing is performed on the image blocks B2 to B4.

Thereafter, when the image block B5 belonging to the tile T2 is coded, a filter 119 filters a boundary area between the coded image blocks B1 and B5. In the filtered boundary area, the filtering result of an area near the image block B1 is written into the memory 17 via the bus 15. At this point, a boundary area at the image block B2 in the image block B1 stored in the memory 17 is overwritten with the filtering result. In this case, the image block B1 is stored in the memory 17 without being compressed, so that the address of a storage area overwritten with the filtering result is easily calculated. The filtering result may be written into the memory 17 from a coding circuit 11 through the compression circuit 13 or may be directly written into the memory 17 from the coding circuit 11. The same processing is performed on the image blocks B6 to B8 after the completion of filtering on boundary areas at the image blocks B2 to B4.

Furthermore, the compression circuit 13 compresses the coded and filtered image block B5. The compressed image block B5 is written into the memory 17 via the bus 15. The same processing is performed on the image blocks B6 to B8.

As described above, as in the first embodiment, the image processor 1 and the image processing system SYS1 including the same according to the present embodiment can efficiently perform image processing without increasing the circuit size even if the tile boundary X1 is located on the boundary between the adjacent image blocks.

Third Embodiment

Figure 4:
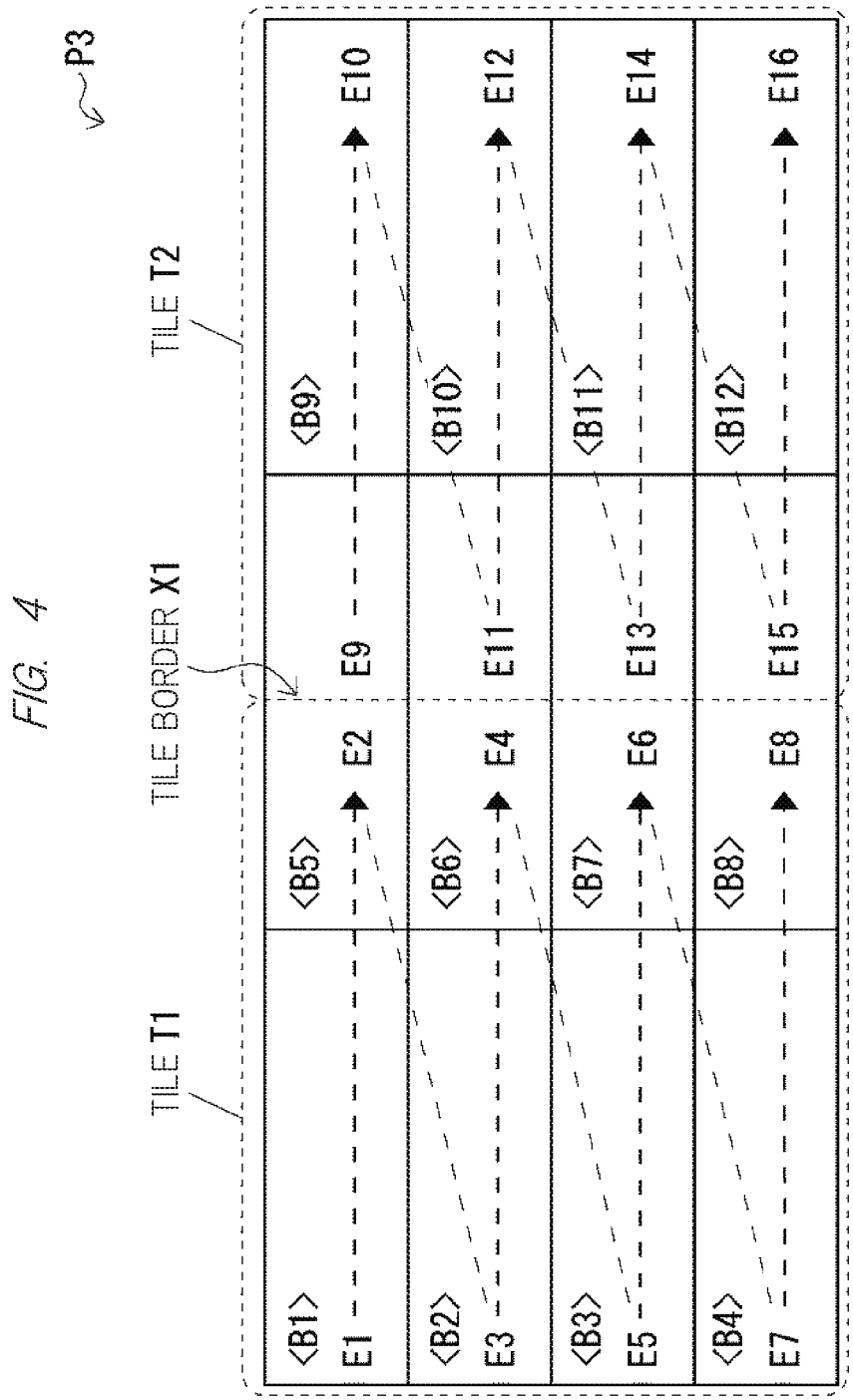
FIG. 4 is a schematic diagram of a partial area P3 of the target image DVin.
Figure 5:
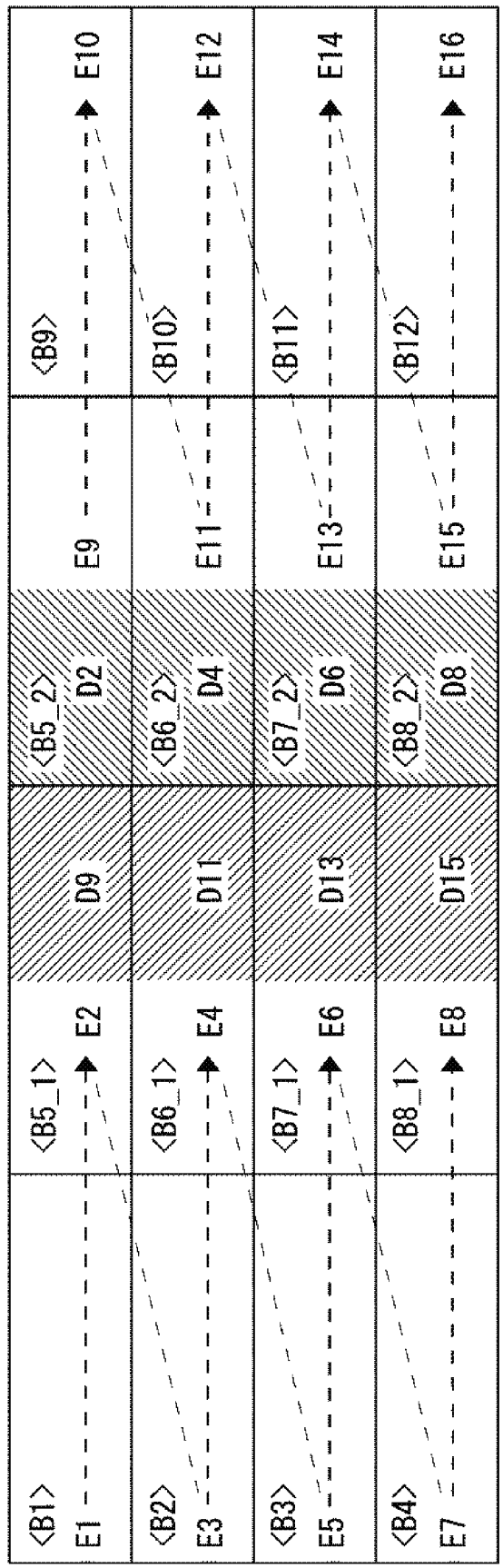
FIG. 5 is an image of a dummy area inserted into the partial area P3 of the target image DVin.
Figure 6:
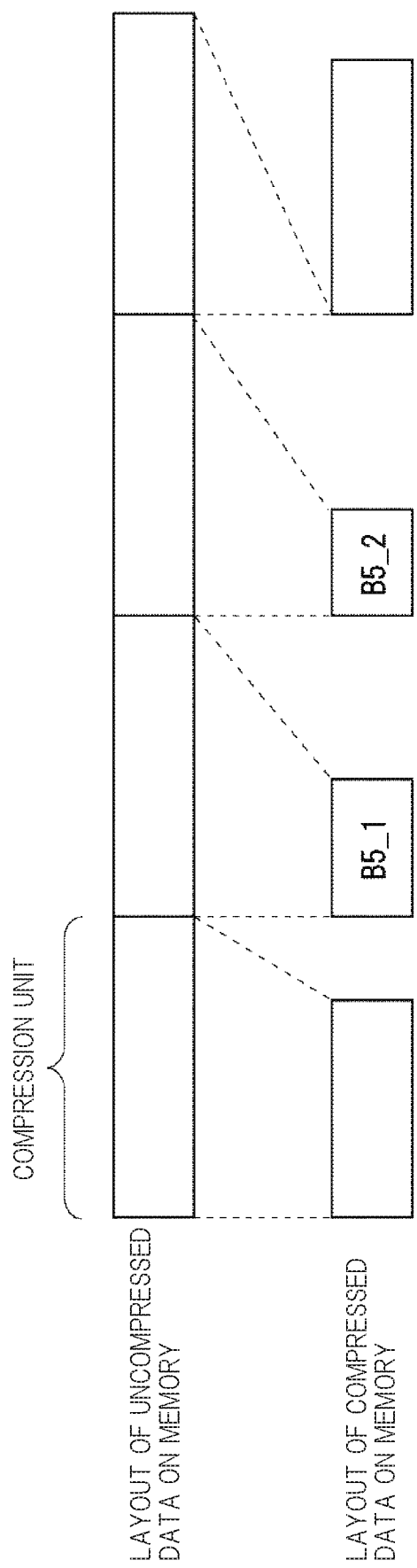
FIG. 6 shows a difference in the layout of the image block on a memory depending on whether the image block is compressed or not.

Referring to FIGS. 4 to 6, the present embodiment will describe another example of determination and compression by an image processor 1. In the present embodiment, filtering of an image is not necessary on a tile boundary X1.

FIG. 4 is a schematic diagram of a partial area P3 of an image DVin to be coded. The relationship between tiles T1 and T2 and image blocks B1 to B12 in the area P3 of FIG. 4 is similar to that of the area P1 in FIG. 2 and thus the explanation thereof is omitted. FIG. 5 is an image of a dummy area inserted into the partial area P3 of the target image DVin. FIG. 6 shows a difference in the layout of the image block on a memory depending on whether the image block is compressed or not.

If filtering of an image on the tile boundary X1 is not necessary, a compression circuit 13 compresses the image block regardless of whether the tile boundary X1 is included in the area of the image block to be compressed.

For example, even if a determination circuit 12 determines that the tile boundary X1 is included in the area of the image block B5, the compression circuit 13 compresses the image block B5.

Specifically, the compression circuit 13 first compresses an image block B5_1 serving as a unit of compression, the image block B5_1 including the image data of an area E2 (hereinafter will be referred to as image data E2) near the tile T1 coded in advance and dummy data D9. The compressed image block B5_1 is written into a memory 17 via a bus 15. Likewise, image blocks B6_1, B7_1, and B8_1, which are combinations of image data E4, E6, and E8 and dummy data D11, D13, and D15, are written into the memory 17 via the bus 15.

Thereafter, the compression circuit 13 compresses an image block B5_2 serving as a unit of compression at the completion of coding on an area E9 near the tile T2, the image block B5_2 including the image data of the area E9 (hereinafter will be referred to as image data E9) near the coded tile T2 and dummy data D2. The compressed image block B5_2 is written into the memory 17 via the bus 15. Likewise, image blocks B6_2, B7_2, and B8_2, which are combinations of image data E11, E13, and E15 and dummy data D4, D6, and D8, are written into the memory 17 via the bus 15.

The image block B5 is read in the following steps. A decompression circuit 14 first reads the compressed image blocks B5_1 and B5_2 from the memory 17 via a bus 16. The decompression circuit 14 then expands the compressed image blocks B5_1 and B5_2. Subsequently, the decompression circuit 14 removes the dummy data D9 and D2 from the expanded image blocks B5_1 and B5_2 and combines the remaining image data E2 and E9 so as to reproduce image data B5.

The starting addresses of the compressed and stored image data B5_1 and B5_2 in the memory 17 are preferably set as those of the uncompressed image data (see FIG. 6). This facilitates access to the image data B5_1 and B5_2. Alternatively, when the compressed image data B5_1 and B5_2 are written into the memory 17, auxiliary information may be written, the auxiliary information including information on the division of the image data B5 into the image data B5_1 and B5_2 and the data sizes of the image blocks B5_1 and B5_2 before being combined with the dummy data D9 and D2.

As described above, if filtering of an image on the tile boundary X1 is not necessary, the image processor 1 and an image processing system SYS1 including the same according to the present embodiment compress, as an image block with dummy data, one of areas separated by the tile boundary X1 in the image block serving as a unit of compression and compress the other area as another image block with dummy data. Thus, the image processor 1 and the image processing system SYS1 including the same according to the present embodiment can suppress the consumption of a band at the bus between the image processor 1 and the memory 17, though the memory 17 requires a larger storage capacity.

Fourth Embodiment

The first to third embodiments described the image processor 1 for coding images. The present embodiment will describe an image processor 2 for decoding a coding stream.

Figure 7:
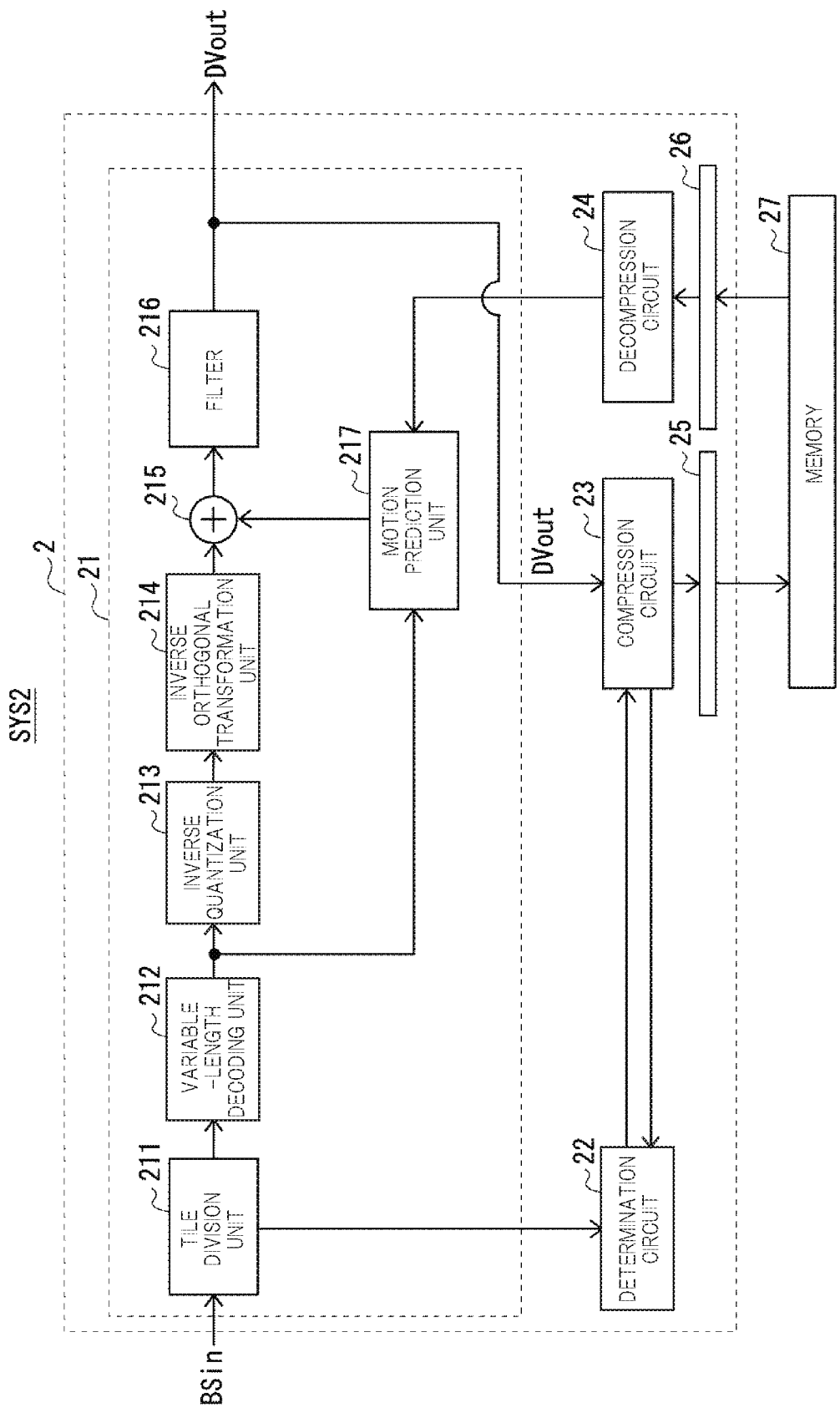
FIG. 7 illustrates a configuration example of an image processing system according to a fourth embodiment.

FIG. 7 is a block diagram illustrating a configuration example of an image processing system (semiconductor system) SYS2. The image processing system SYS2 is a system for decoding and compression on a coding stream BSin.

As shown in FIG. 7, the image processing system SYS2 includes a decoding circuit (image processing circuit) 21, a determination circuit 22, a compression circuit 23, a decompression circuit 24, a bus 25, a bus 26, and a memory 27. The constituent elements of the image processing system SYS2 other than the memory 27 include the image processor (semiconductor device) 2.

The coding circuit 21 is a section for generating an image DVout by decoding the coding stream BSin to be decoded. Specifically, the decoding circuit 21 includes a tile division unit 211, a variable-length decoding unit 212, an inverse quantization unit 213, an inverse orthogonal transformation unit 214, an adder 215, a filter 216, and a motion prediction unit 217.

The tile division unit 211 divides the coding stream BSin to be decoded, into multiple tiles serving as units of decoding. The decoding of the tiles by the decoding circuit 21 is actually performed in a segmented manner in processing blocks including each tile. For example, in HEVC (High Efficiency Video Coding), decoding is performed in CTBs (Coding Tree Blocks) including each tile. Moreover, in VP9, decoding is performed in Superblocks including each tile. As a matter of course, decoding is not always performed in CTBs or Superblocks and can be performed in other processing blocks including each tile.

The variable-length decoding unit 212 decodes, with variable lengths, the tiles sequentially outputted from the tile division unit 211 (hereinafter will be referred to as decoding target tiles), so that a quantized DCT coefficient is outputted.

The inverse quantization unit 213 performs inverse quantization on the quantized DCT coefficient. The inverse orthogonal transformation unit 214 performs inverse DCT on the DCT coefficient inversely quantized by the inverse quantization unit 213, so that a differential decoding tile is outputted.

The adder 215 adds the differential decoding tile and a corresponding prediction tile outputted from the motion prediction unit 217. The filter 216 filters the output result of the adder 215, so that a decoded tile (decoding tile) is outputted. For example, the filter 216 performs filtering for smoothing irregularities at tile boundaries.

In this configuration, the decoding circuit 21 performs the same processing on each of the decoding target tiles including a decoding BSout to be decoded, so that an image DVout including multiple decoding tiles is outputted.

The determination circuit 22 determines whether a tile boundary X1 is included in the image blocks serving as the units of compression of the image DVout, based on division information acquired by the tile division unit 211 and compression information acquired by the compression circuit 23. The division information acquired by the tile division unit 211 includes information on, for example, the positions and sizes of the tiles. The compression information acquired by the compression circuit 23 includes information on, for example, the positions and sizes of the image blocks. The positions and sizes of the image blocks can be acquired from the storage address of the memory 27.

The compression circuit 23 compresses the image blocks serving as the units of compression of the image DVout, according to the determination result of the determination circuit 22. For example, if the determination circuit 22 determines that the tile boundary X1 is not included in the image block to be compressed, the compression circuit 23 compresses the image block. In contrast, if the determination circuit 22 determines that the tile boundary X1 is included in the image block to be compressed, the compression circuit 23 does not compress the image block. The image block compressed (or not compressed) by the compression circuit 23 is written into the memory 27 via the bus 25. The image block written into the memory 27 is used for inter-image prediction (inter-frame prediction) by the motion prediction unit 217 provided in the decoding circuit 21.

The decompression circuit 24 expands the image block compressed by the compression circuit 23 from among the image blocks read from the memory 27 via the bus 26. The decompression circuit 24 then combines the image blocks so as to reproduce the image DVout.

In the decoding circuit 21, the motion prediction unit 217 generates the prediction image between the tiles by comparing the decoding target tile and the tile (reference tile) of an area corresponding to the decoding target tile in the image DVout, and then the motion prediction unit 217 outputs, as the prediction tile, the tile compensating for the predicted image. As described above, the prediction tile is supplied to the adder 215.

Thus, the image processor 2 and the image processing system SYS2 including the same according to the present embodiment do not compress the image block including the tile boundary X1. This can eliminate the need for providing a holding circuit for holding the decoding result of one of two tiles, which are formed on both sides of the tile boundary X1, until the completion of image processing on one of the tiles after the completion of image processing on the other tile. Furthermore, the image processor 2 and the image processing system SYS2 including the same according to the present embodiment compress the image block not including the tile boundary X1. This can suppress the consumption of a band at the bus between the image processor 2 and the memory 27, achieving efficient image processing. In short, the image processor 2 and the image processing system SYS2 including the same according to the present embodiment can efficiently perform image processing without increasing the circuit size.

Determination and compression by the image processor 2 according to the fourth embodiment are similar to the determination and compression by the image processor 1 according to the first to third embodiments and thus the explanation thereof is omitted.

As described above, the image processor and the image processing system including the same according to the first to fourth embodiments do not compress the image block including the tile boundary X1. This can eliminate the need for providing a holding circuit for holding the image processing result of one of two tiles, which are formed on both sides of the tile boundary X1, until the completion of image processing on one of the tiles after the completion of image processing on the other tile. Furthermore, the image processor and the image processing system including the same according to the first to fourth embodiments compress the image block not including the tile boundary X1. This can suppress the consumption of a band at the bus between the image processor and the memory, achieving efficient image processing. In short, the image processor and the image processing system including the same according to the first to fourth embodiments can efficiently perform image processing without increasing the circuit size.

The invention made by the present inventors was specifically described in accordance with the foregoing embodiments. Obviously, the present invention is not limited to the embodiments and various changes can be made within the scope of the invention.

What is claimed is:

1. A semiconductor device comprising:
an image processing circuit to perform image processing on a target image, wherein the target image is divided into a first tile and a second tile, and wherein the image processing is performed on each of the first and second tiles on a tile-by-tile basis;
a determination circuit to determine whether a tile boundary between the first tile and the second tile is included in an image block of the image processed target image, the image block serving as a unit of compression of the image processed target image; and
a compression circuit to compress the image processed target image on a block-by-block basis, according to a determination result of the determination circuit,
wherein when the determination circuit determines that the tile boundary is included in the image block to be compressed, the compression circuit does not compress the image block.

2. The semiconductor device according to claim 1, wherein when the determination circuit determines that the tile boundary is not included in the image block to be compressed, the compression circuit compresses the image block.

3. The semiconductor device according to claim 1,
wherein the image processing circuit is a coding circuit configured to generate a coding stream by coding each of the first and second tiles of the target image and generate a local decoding image corresponding to the coding stream, and
wherein the compression circuit is configured to compress the image block coded by the coding circuit, according to the determination result of the determination circuit.

4. The semiconductor device according to claim 1,
wherein the image processing circuit is a decoding circuit configured to generate a decoded image by decoding each of the first and second tiles of the target image, and
wherein the compression circuit is configured to compress the image block decoded by the decoding circuit, according to the determination result of the determination circuit.

5. The semiconductor device according to claim 1,
wherein the compression circuit performs compression in parallel with the image processing,
wherein when the determination circuit determines that the tile boundary is included in the image block to be compressed, the compression circuit compresses the image block and write the compressed image block into a memory, and
wherein when the determination circuit determines that the tile boundary is not included in the image block to be compressed, the compression circuit 1) does not compress the image block, 2) write a first area of the non-compressed image block that corresponds to the image processed first tile into the memory, and 3) write a second area of the non-compressed image block that corresponds to the image processed second tile into the memory.

6. The semiconductor device according to claim 5, wherein the compression circuit is configured to 1) write, in addition to the first area, a dummy image substituting for the second area into the memory, and then 2) overwrite a storage area containing the dummy image in the memory with the second area without compression.

7. The semiconductor device according to claim 5,
wherein the image processing circuit is configured to further filter a boundary area, between an image of the first area and an image of the second area, and
wherein the compression circuit is configured to, after the image-processed image of the first area is written into the memory without compression, overwrite a corresponding storage area of the memory with a filtering result of the image of the first area from among results of the filtering without compression and write the image-processed and filtered image of the second area into the memory without compression.

8. The semiconductor device according to claim 1,
wherein if the determination circuit determines that the tile boundary is located over a boundary between a first image block and a second image block, the first image block and the second image block being adjacent to each other,
wherein the image processing circuit filters, after the image processing is performed on the first and second image blocks, a boundary area between the first and second image blocks and,
wherein the compression circuit overwrites, after the image-processed first block is written into a memory without compression, a corresponding storage area of the memory with a filtering result of an area of the first image block from among filtering results of the boundary area between the first and second image blocks without compression and writes the image-processed and filtered second image block into the memory after compressing the second image block.

9. The semiconductor device according to claim 1,
wherein the image processing circuit is configured to perform image processing on an image of one of areas separated by the tile boundary in the image block and then perform image processing on an image of the other area, and
wherein the compression circuit 1) compresses, when the image processing circuit does not filter an image over the tile boundary, a first division image block as a unit of compression, writes the first division image block into a memory, 2) compresses a second division image block as a unit of compression, and then 3) writes the second division image block into the memory regardless of the determination result of the determination circuit, the first division image block including the image-processed image of the one area and a first dummy image substituting for the image of the other area, the second division image block including the image-processed image of the other area and a second dummy image substituting for the image of the one area.

10. The semiconductor device according to claim 9, further comprising a decompression circuit configured to expand the first and second division image blocks read from the memory after the compression, and then reproduce the image blocks by combining the expanded image of the one area and the expanded image of the other area.

11. A semiconductor system comprising:
a bus;
the semiconductor device according to claim 1, the semiconductor device being coupled to the bus; and
a memory in which an output result of the semiconductor device is written via the bus.

12. A processing method using a semiconductor device, comprising the steps of:
- performing image processing on a target image divided into first and second tiles, the image processing being performed on the target image on a tile-by-tile basis;
- determining whether a tile boundary between the first and second tiles is included in an image block of the image processed target image, the image block serving as a unit of compression of the image processed target image; and
- compressing the image processed target image on a block-by-block basis according to a determination result,
- wherein if it is determined that the tile boundary is included in the image block to be compressed, the image block to be compressed is not compressed in the step of compression.

13. The processing method using a semiconductor device according to claim 12, wherein if it is determined that the tile boundary is not included in the image block to be compressed, the image block to be compressed is compressed in the step of compression.

14. The processing method using a semiconductor device according to claim 12,
- wherein in the step of image processing, a coding stream is generated by coding the target image for each of the first and second tiles and a local decoding image corresponding to the coding stream is generated, and
- wherein in the step of compression, the coded image block is compressed according to the determination result.

15. The processing method using a semiconductor device according to claim 12,
- wherein in the step of image processing, a decoded image is generated by decoding the target image for each of the first and second tiles, and
- wherein in the step of compression, the decoded image block is compressed according to the determination result.

* * * * *